United States Patent [19]

Palmer

[11] 3,749,295

[45] July 31, 1973

[54] THEFT-PROOF LOCK-MEANS FOR SECURING A MOTORCYCLE TO THE VEHICLE CARRYING DECK OF A MOTOR COACH

[76] Inventor: Robert E. Palmer, 7100 Columbia Rd., 51 Brookins, Olmstead Falls, Ohio 44138

[22] Filed: Dec. 13, 1971

[21] Appl. No.: 207,348

[52] U.S. Cl. .................. 224/29 R, 70/54, 70/234, 211/5, 224/42.03 B
[51] Int. Cl. ...................... B60r 9/10, E05b 71/00
[58] Field of Search ................. 70/58, 230, 233, 70/234, 235, 229; 211/5, 17, 22; 214/450; 224/29 R, 42.03 B; 248/203

[56] References Cited
UNITED STATES PATENTS

| 606,118 | 6/1898 | Bowman | 211/5 |
| 2,803,349 | 8/1957 | Talbot | 211/22 |
| 2,805,860 | 9/1957 | Littig | 272/73 |
| 3,176,903 | 4/1965 | Farley | 224/42.03 B |
| 3,591,029 | 7/1971 | Coffey | 214/450 |

Primary Examiner—Albert G. Craig, Jr.
Attorney—Sanford Schnurmacher

[57] ABSTRACT

Clamp-means for securing a motorcycle to a platform by means of a padlock whose shackle is surrounded by case-hardened steel elements so shaped that the shackle cannot be reached by cutting sawing tools.

1 Claim, 7 Drawing Figures

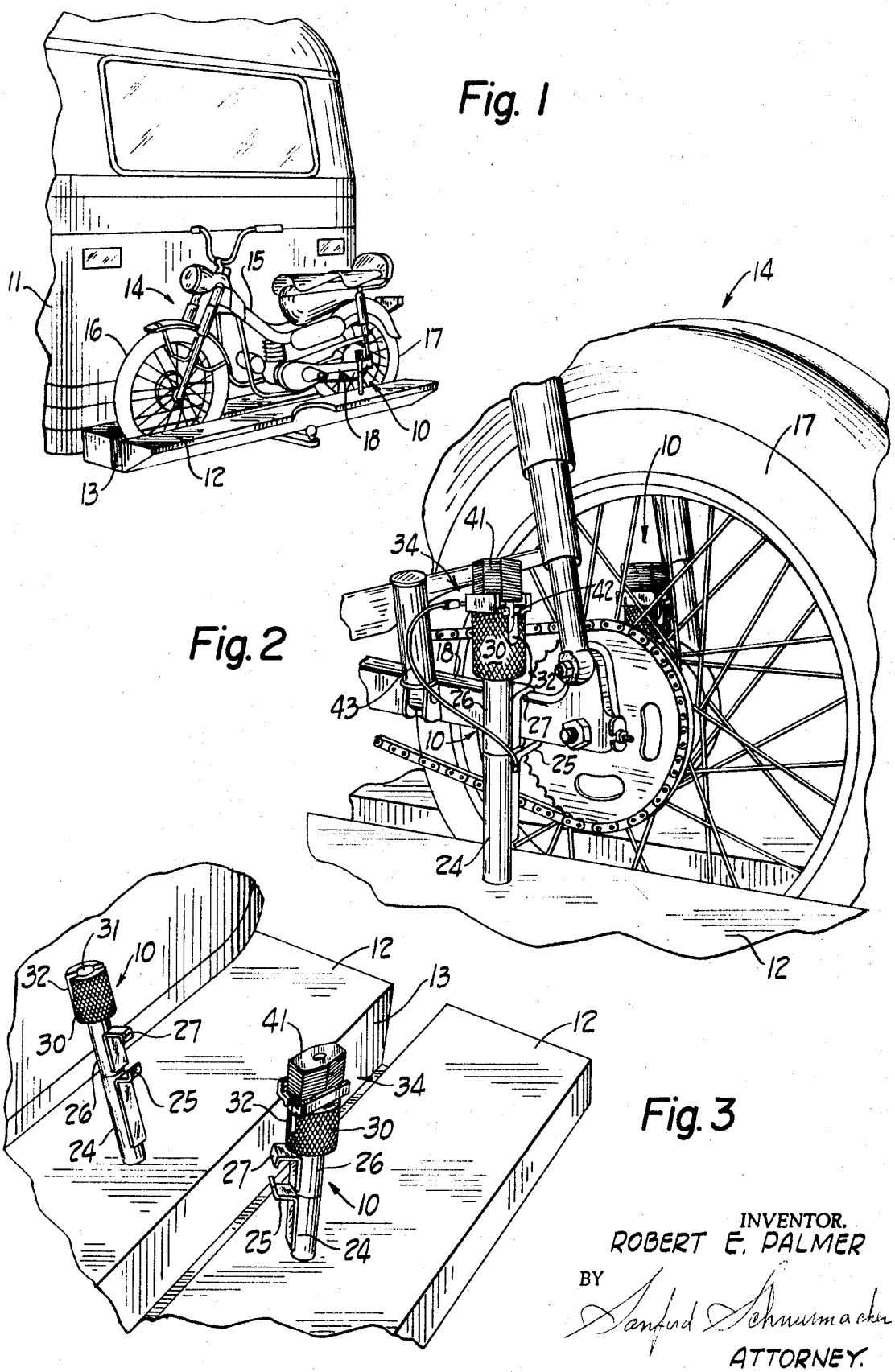

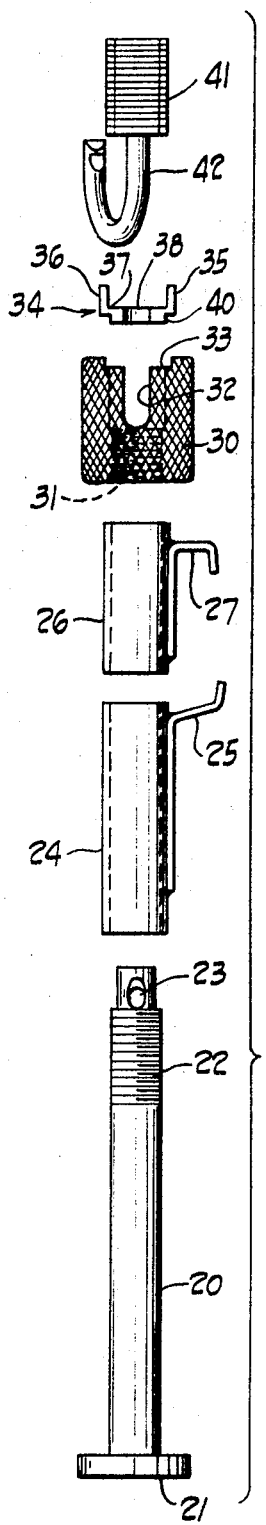
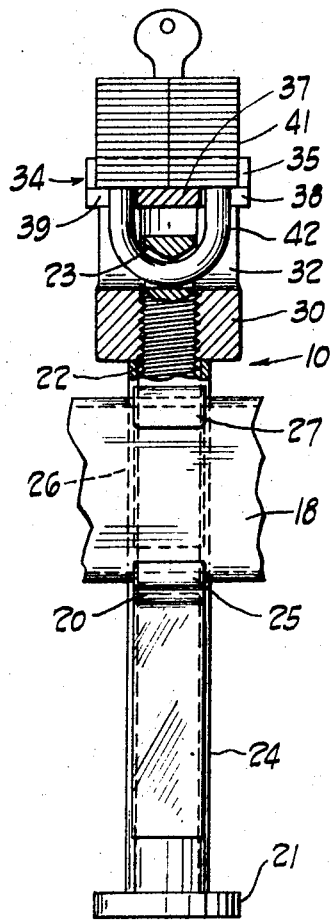
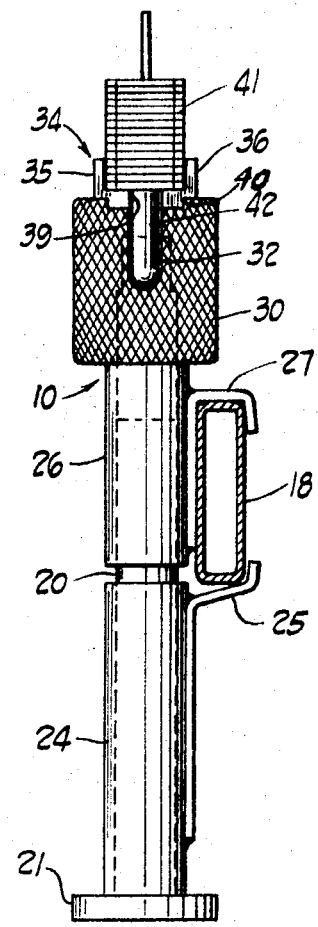
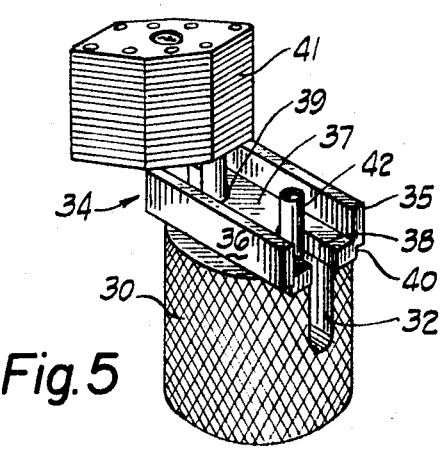
Fig. 6    Fig. 4
Fig. 7
Fig. 5
INVENTOR.
ROBERT E. PALMER

THEFT-PROOF LOCK-MEANS FOR SECURING A MOTORCYCLE TO THE VEHICLE CARRYING DECK OF A MOTOR COACH

Conducive to a better understanding of the invention it may be well to point out that when traveling in a family motor-coach, upon reaching a destination, there is no means available for local travel as there is with a trailer unit whose pulling automobile can be disconnected, and used separately.

It has, therefore, become common practice to carry a motorcycle, supported on a rear platform, or deck, mounted on the motor-coach, for local travel.

In order to discourage theft by casual passers-by the motorcycle is usually secured to the motor-coach through chains and padlocks. However, this is no deterrent to professional thieves who use chain cutters and saws to effect release of the so secured motorcycle, easily and quickly.

The primary object of the invention, therefore, is to provide padlock locking-means for securing a motorcycle on the rear deck of a family motor-coach in theft-proof engagement therewith.

Another object is to provide a structure of the type stated wherein the shackle of the padlock locking-means cannot be easily reached by bolt cutters or saws.

These, and other objects of the invention will become apparent from a reading of the following specification and claims together with the accompanying drawing, wherein like parts are referred to and indicated by like reference numerals, and wherein:

FIG. 1 is a perspective view of the rear deck of a family motor-coach showing a motorcycle secured thereon by the theft-proof lock-means that is the subject of this invention;

FIG. 2 is an enlarged view of the rear wheel area of a motorcycle frame, showing it engaged by the co-operating theft-proof lock-means;

FIG. 3 is a perspective view of the family motor-coach rear deck, without the motorcycle, showing the co-operating theft-proof lock-means mounted thereon; one in partially assembled condition, and the other in fully locked condition;

FIG. 4 is a side view of the theft proof lock-means, showing it engaged with the motorcycle frame, in section;

FIG. 5 is a perspective view of the area of the tension-nut and safety-spacer showing the padlock in its open condition;

FIG. 6 is a front view of the lock-means, partly in section, engaged with the motorcycle frame; and, FIG. 7 is an exploded view of the theft-proof lock-means.

Referring more particularly to the drawing there is seen in FIGS. 1 and 2 the Theft-proof Lock-Means that is the subject of the invention, broadly indicated by reference numeral 10, as it appears in locked engagement with the rear wheel suspension frame 18 of a motorcycle 14, fitted into the wheel slot 13 of the rear deck 12 of a conventional family motor-coach 11.

All of the steel structural elements described hereinafter are casehardened to provide the maximum surface resistance to cutting tools.

As is seen most clearly in FIG. 7, the lock-means 10 comprises 5 interfitting parts in addition to the padlock 41.

The basic element is the bolt 20, which has a circular flat head 21. The bolt 20 is fitted loosely through a hole in the deck 12 with the head 21 bearing against the under-side of the deck, as seen in FIG. 3.

The upper end of the bolt is threaded, as at 22, and has a diametric hole 23 of a size and shape to receive the shackle 42 of a padlock 41 therethrough, as explained hereinafter.

Two sleeves 24 and 26 are slidably mounted on the bolt, one above the other. The sleeves have upwardly and downwardly directed arms 25 and 27, respectfully.

Reference numeral 30 indicates a cylindrical tension-nut whose diameter is substantially greater than the width of the shackle 42 of the padlock 41.

The tension-nut 30 has a central bore 31 adapted to threadedly engage the threaded upper end 22 of the bolt 20.

Reference numeral 32 indicates a vertical, diametric, slot cut in the upper portion of the tension-nut, of a width to slidably receive the shackle 42 of the padlock 41, as seen most clearly in FIGS. 4 and 6.

The tension-nut 30 also has a shallow diametric groove 33 cut in the upper surface thereof at the slot 32, as seen in FIG. 7.

An elongated safety-spacer 34 has an undersurface 40 adapted to rest upon the upper surface of the tension-nut 30 in interfitting engagement with the tension-nut groove 33, as seen in FIGS. 4 and 5.

The safety-spacer 34 has parallel, upstanding, side walls 35 and 36 spaced a distance to snuggly receive the body of the padlock 41 therebetween. The overall length of the safety-spacer is greater than that of the padlock 41, as seen most clearly in FIG. 6.

The bottom wall 37 of the safety-spacer has an open slot 38 and 39, at either end thereof, as seen most clearly in FIG. 5.

To secure a motorcycle 10 in place on a motor coach deck 12, as illustrated in FIG. 1, the following procedure is followed:

Two lock-means 10 are mounted on opposite sides of the deck wheel slot 13, as seen in FIG. 3.

The motorcycle 14 is positioned on the deck 12 with its wheels 16 and 17 fitted in the deck slot 13, as seen most clearly in FIG. 1, with the two lock-means 10 adjacent the rear wheel suspension frame 18, immediately forward of the axle of the rear wheel 17.

The bolt member 20 is tilted toward the motorcycle frame 18; the sleeves 24 and 26 are positioned, one above the other, on the bolt 20 with the lower bracket arm 25 fitted against the underside of the frame 18, and the upper bracket arm 27 fitted on top of the frame 18, as is seen most clearly in FIG. 4.

The tension nut 30 is then screwed down on the bolt 20, against the sleeve 26 to force the sleeve bracket arms 25 and 27 into snug engagement with the motorcycle frame 18, as seen in FIGS. 1, 2 and 4.

At this point the tension-nut must be further tightened, or backed off, in order that its diametric slot 32 is in line with the bolt hole 23, as seen most clearly in FIG. 6.

The padlock 41 is then opened and its shackle 42 aligned with the bolt hole 32, and its free end inserted through the bolt hole 23.

The safety-spacer 34 is then aligned with the so positioned shackle and one slot 39 is slipped against the end of the shackle attached to the padlock body 41. The safety-spacer is then placed flat with its undersurface 40 resting upon the upper surface of the tension nut 30 in interfitting engagement with the tension-nut groove 33. When this is done the free end of the shackle 42 will be positioned upright in the second safety-spacer slot 38, as seen most clearly in FIG. 5.

The padlock 41 is then swung around into alignment with the free end of the so held shackle 42, and pushed downward, between the safety-spacer side walls 35 and 36, into locked engagement with its shackle 42, as seen most clearly in FIGS. 2 and 4

The motorcycle frame is thus anchored to the motor-coach deck 12 by the two co-operating theft-proof lock-means 10, as seen in FIG. 2.

The so locked tension-nut 30 cannot be rotated, thereby preventing the separation of the bracket arms 25 and 27, which firmly grip the motorcycle frame 18.

As stated hereinbefore all of the parts of the unit 10 are made of casehardened steel and therefore are extremely resistant to cutting tools. The lock-means 10 does not employ any chains, only a padlock 41.

The preferred type of padlock 41, illustrated, is the type whose body is fabricated from a plurality of stacked casehardened steel plates of rectangular shape. Such a padlock body is also highly resistant to cutting tools.

A study of FIGS. 5 and 6 will show that the width of the shackle 42 is less than the diameter of the tension-nut 30 and the length of the safety-spacer 34; thus, a saw blade cannot touch the shackle 42 until the casehardened tension-nut and safety-spacer have been cut into.

Again, by referring to FIG. 4, it will be evident that when the padlock body 41 is in locked engagement with its shackle 42 its sides are nested between the upstanding walls 35 and 36 of the safety-spacer 34, thus further protecting the shackle 42 from contact with any cutting tool.

To legally release the motorcycle 14, the padlock is unlocked by means of its key. The body 41 can then be lifted clear of the safety-spacer side walls 35 and 36, and swung away from the free end of the shackle 42 to the position shown in FIG. 5.

The safety-spacer 34 is then lifted from the tension-nut groove 33, leaving the padlock shackle 42 free to be withdrawn from the bolt bore 23.

The tension-nut 30 is then unscrewed, freeing the sleeve bracket arms 27 and 25 for disengagement from the motorcycle frame 18.

Upon disengagement, the motorcycle 14 can be rolled along the slot 13, and off the deck 12.

It will now be clear that there is provided a device which accomplishes the objectives heretofore set forth.

While the invention has been disclosed in its preferred form, it is to be understood that the specific embodiment thereof, as described and illustrated herein, is not to be considered in a limited sense, as there may be other forms or modifications of the invention which should also be construed to come within the scope of the appended claim.

I claim:

1. In combination with a motorcycle mounted on the deck of a family motor-coach, a theft-proof lock-means fabricated from casehardened steel, comprising:
   a. an upstanding bolt loosely mounted through a hole in the motor-coach deck proximate the rear wheel suspension frame of the motorcycle;
   b. said bolt having a circular head at its bottom end in contact with the underside of the motor-coach deck, a threaded body, and a diametric bore proximate its upper end of a size and shape to receive the shackle of a padlock therethrough;
   c. a padlock having its shackle pivotally connected to the body thereof;
   d. two sleeves slidably mounted on the bolt body, one above the other, below the diametric bore;
   e. the lower sleeve having a lateral extending, upwardly directed, bracket arm engagable with the lower portion of the rear wheel suspension frame;
   f. the upper sleeve having a laterally extending, downwardly directed, bracket arm engagable with the upper portion of the rear wheel suspension frame;
   g. a cylindrical tension-nut threadedly mounted at the upper end of the bolt, above the upper sleeve, having a diameter substantially greater than the width of the shackle of the aforesaid padlock, a vertical diametric slot cut in its upper half, of a width to receive the shackle therein, the tension-nut also having a shallow, diametric, groove in its upper surface aligned with the slot, of a width greater than the slot;
   h. an elongated safety-spacer adapted to interfit the tension-nut groove, of substantially greater length than the padlock, having parallel up-standing side walls spaced a distance apart to snuggly receive the body of the padlock therebetween, and a bottom wall having aligned and oppositely extending open-ended slots, adapted to receive the shackle of the padlock nested between the side walls, therethrough;
   i. the sleeve bracket arms being in theft-proof locked engagement with the motorcycle rear wheel suspension frame when the tension-nut bears against the upper sleeve with its vertical slot aligned with the bolt bore, with the safety-spacer seated in the tension-nut groove, with the body of the padlock fitted between the safety-spacer side walls in its locked condition, with its shackle fitted through the bolt bore and nested within the tension-nut and safety-spacer slots.

* * * * *